US012616868B2

(12) United States Patent
Beck et al.

(10) Patent No.: US 12,616,868 B2
(45) Date of Patent: May 5, 2026

(54) INTELLIGENT WEIGHTLIFTING RACK

(71) Applicant: INTERNATIONAL BUSINESS MACHINES CORPORATION, Armonk, NY (US)

(72) Inventors: Matthew Beck, Danbury, CT (US); Michael S. Gordon, Croton on Hudson, NY (US); Brian Paul Gaucher, Brookfield, CT (US); Kevin W. Brew, Niskayuna, NY (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 18/227,034

(22) Filed: Jul. 27, 2023

(65) Prior Publication Data

US 2025/0032840 A1      Jan. 30, 2025

(51) Int. Cl.
A63B 21/078        (2006.01)
A63B 24/00        (2006.01)
            (Continued)

(52) U.S. Cl.
CPC ...... A63B 21/0783 (2015.10); A63B 24/0087 (2013.01); G06T 7/70 (2017.01); G10L 15/08 (2013.01); G10L 15/22 (2013.01); A63B 2220/12 (2013.01); A63B 2220/17 (2013.01); A63B 2220/806 (2013.01);
            (Continued)

(58) Field of Classification Search
CPC ............ A63B 21/0783; A63B 21/0724; A63B 21/078; A63B 24/0087; A63B 2220/12;

A63B 2220/17; A63B 2220/806; A63B 2225/72; A63B 2225/50; A63B 2024/0093; G06T 7/70; G06T 2207/30221;
            (Continued)

(56) References Cited

U.S. PATENT DOCUMENTS 7,963,886 B1 *  6/2011  Schwinn ............ A63B 21/0783
                                            482/99
8,900,097 B1 *  12/2014  Griggs ............... A63B 21/4043
                                            482/4
            (Continued)

FOREIGN PATENT DOCUMENTS

WO        2010100493        9/2010

OTHER PUBLICATIONS

Wikipedia., Smith machine, https://en.wikipedia.org/wiki/Smith_machine, Jun. 18, 2023; 3 Pages.
            (Continued)

*Primary Examiner* — Megan Anderson
*Assistant Examiner* — Jonathan A Dicuia
(74) *Attorney, Agent, or Firm* — Seed Intellectual Property Law Group LLP

(57)        ABSTRACT

An intelligent weightlifting apparatus includes a frame including vertically oriented members and safety rails that are selectively moveable up and down relative to the vertically oriented members. The apparatus includes a position sensor that is configured to detect a position of a barbell. The apparatus includes a computer that is configured to control movement of the safety rails based on data from the position sensor such that a predefined distance is maintained between the safety rails and the barbell during a free weight exercise.

19 Claims, 5 Drawing Sheets

(51) Int. Cl.
  *G06T 7/70*  (2017.01)
  *G10L 15/08*  (2006.01)
  *G10L 15/22*  (2006.01)

(52) U.S. Cl.
  CPC . *A63B 2225/72* (2013.01); *G06T 2207/30221* (2013.01); *G10L 2015/088* (2013.01); *G10L 2015/223* (2013.01)

(58) Field of Classification Search
  CPC ... G10L 15/08; G10L 15/22; G10L 2015/088; G10L 2015/223
  See application file for complete search history.

(56) References Cited

U.S. PATENT DOCUMENTS

| | | | | |
|---|---|---|---|---|
| 9,492,701 | B1 | 11/2016 | Bognatz | |
| 11,446,538 | B2 | 9/2022 | Silveira | |
| 11,878,203 | B1 * | 1/2024 | Meneve, Jr. | A63B 21/153 |
| 12,048,860 | B2 * | 7/2024 | Neuhaus | A63B 21/0626 |
| 2007/0072750 | A1 * | 3/2007 | Andrews | A63B 21/078 |
| | | | | 482/94 |
| 2014/0304365 | A1 * | 10/2014 | Khanna | H04M 3/4936 |
| | | | | 709/217 |
| 2020/0023226 | A1 * | 1/2020 | Silveira | A63B 21/0626 |
| 2020/0353303 | A1 * | 11/2020 | Hammond | A63B 21/072 |
| 2021/0077884 | A1 * | 3/2021 | De las Casas Zolezzi | |
| | | | | A63B 24/0087 |
| 2021/0394009 | A1 | 12/2021 | Davis | |
| 2022/0062687 | A1 * | 3/2022 | Gao | A63B 21/0783 |
| 2022/0323812 | A1 | 10/2022 | O'Connor | |

OTHER PUBLICATIONS

Bell., "Introducing: Perch, The Startup Using Machine Learning in the Gym For Smart Workouts", https://www.forbes.com/sites/leebelltech/2017/12/31/introducing-perch-the-startup-using-machine-learning-in-the-gym-for-smart-workouts/?sh=1bfb6f202325, Dec. 31, 2017; 3 Pages,.

Bray., "MIT spinoff brings artificial intelligence to the weight room", https://edition.pagesuite.com/popovers/dynamic_article_popover.aspx?artguid=3c2ea1ad-ab95-4ddb-80b7-fd22e75e7525&%3Bappid=1165, Accessed Jul. 26, 2023; 4 Pages.

Des Moines Register., Man bench pressing 315 pounds dies after barbell slips, https://www.usatoday.com/story/news/nation-now/2016/12/30/student-dies-weightlifting-accident/95992420/, Dec. 30, 2016; 2 Pages.

IBM., "International fitness company", https://www.ibm.com/case-studies/international-fitness-company-services, Accessed Jul. 25, 2023; 10 Pages.

Berg., "Paramedic Dies While WeightLifting Alone at Fitness Club", https://www.athleticbusiness.com/print/content/15292534, May 26, 2022; 2 Pages.

* cited by examiner

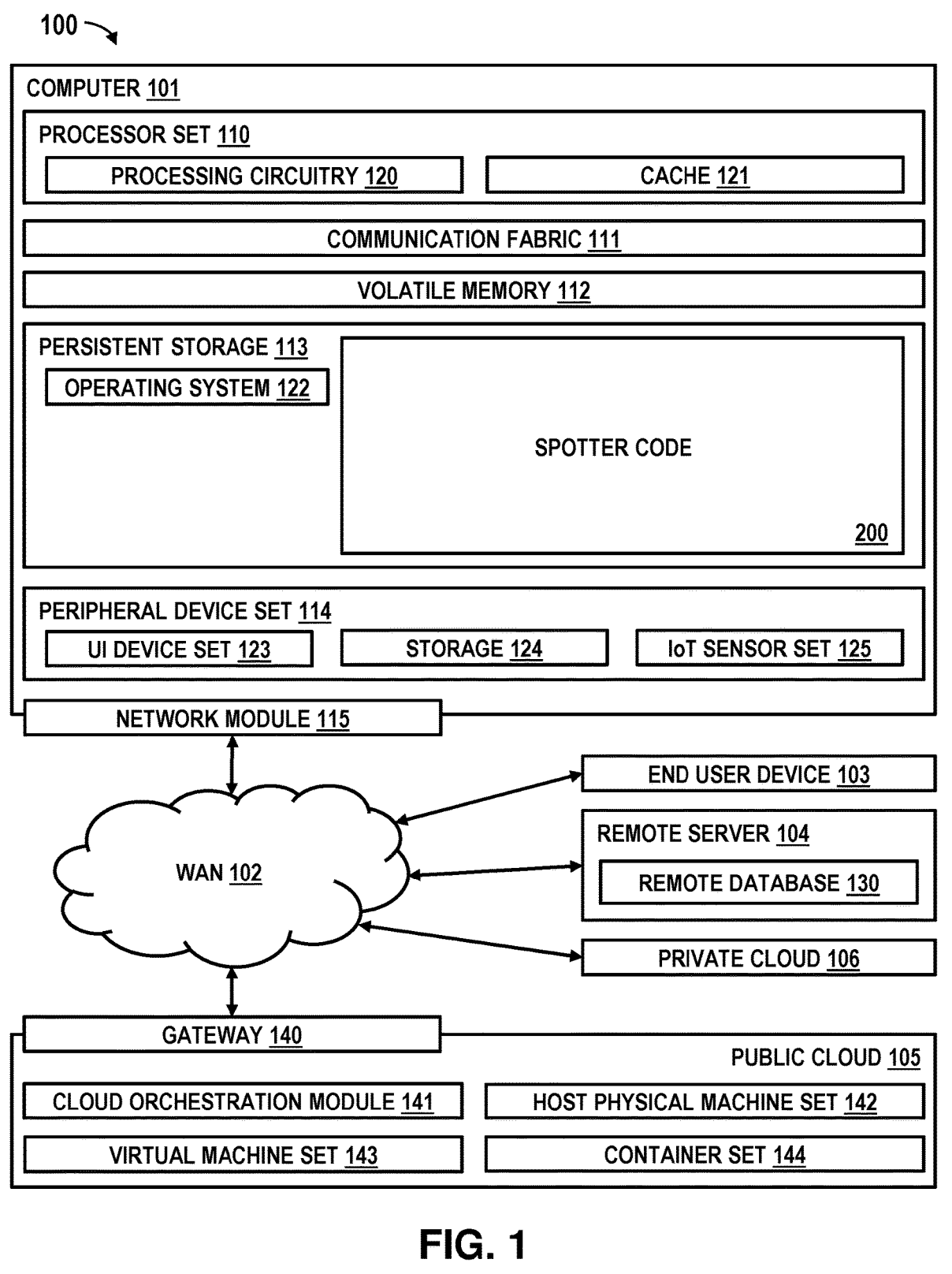

100

COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

SPOTTER CODE

200

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
|---|---|
| VIRTUAL MACHINE SET 143 | CONTAINER SET 144 |

FIG. 1

Detect a position of a barbell relative to safety rails of a weightlifting rack — 505

Dynamically control positions of the safety rails using one or more actuators to maintain a predefined distance between the barbell and the safety rails during a free weight exercise — 510

INTELLIGENT WEIGHTLIFTING RACK

BACKGROUND

Aspects of the present invention relate generally to weightlifting safety equipment and, more particularly, to an intelligent weightlifting rack that provides active monitoring and spotting for a person lifting free weights.

Free weight weightlifting involves the lifting of weights that are not attached to any supporting structure during the lifting. Popular free weight exercises include dead-lift, squat, and bench press. Adjustable racks may be used to support the weights at desired positions before and after the lifting. Some racks include adjustable safety bars that can be positioned prior to the lifting and that are static (i.e., non-moving) during the lifting.

SUMMARY

In a first aspect of the invention, there is an intelligent weightlifting apparatus, comprising: a frame comprising vertically oriented members and safety rails that are selectively moveable up and down relative to the vertically oriented members; a position sensor that is configured to detect a position of a barbell; and a computer that is configured to control movement of the safety rails based on data from the position sensor such that a predefined distance is maintained between the safety rails and the barbell during a free weight exercise.

In another aspect of the invention, there is a method comprising: detecting, by a processor set, a position of a barbell relative to safety rails of a weightlifting rack; and dynamically controlling, by the processor set, positions of the safety rails using one or more actuators to maintain a predefined distance between the barbell and the safety rails during a free weight exercise.

In another aspect of the invention, there is a computer program product including one or more computer readable storage media having program instructions collectively stored on the one or more computer readable storage media. The program instructions are executable to: detect a position of a barbell relative to safety rails of a weightlifting rack; and dynamically control positions of the safety rails using one or more actuators to maintain a predefined distance between the barbell and the safety rails during a free weight exercise.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

DETAILED DESCRIPTION

Figure 2:
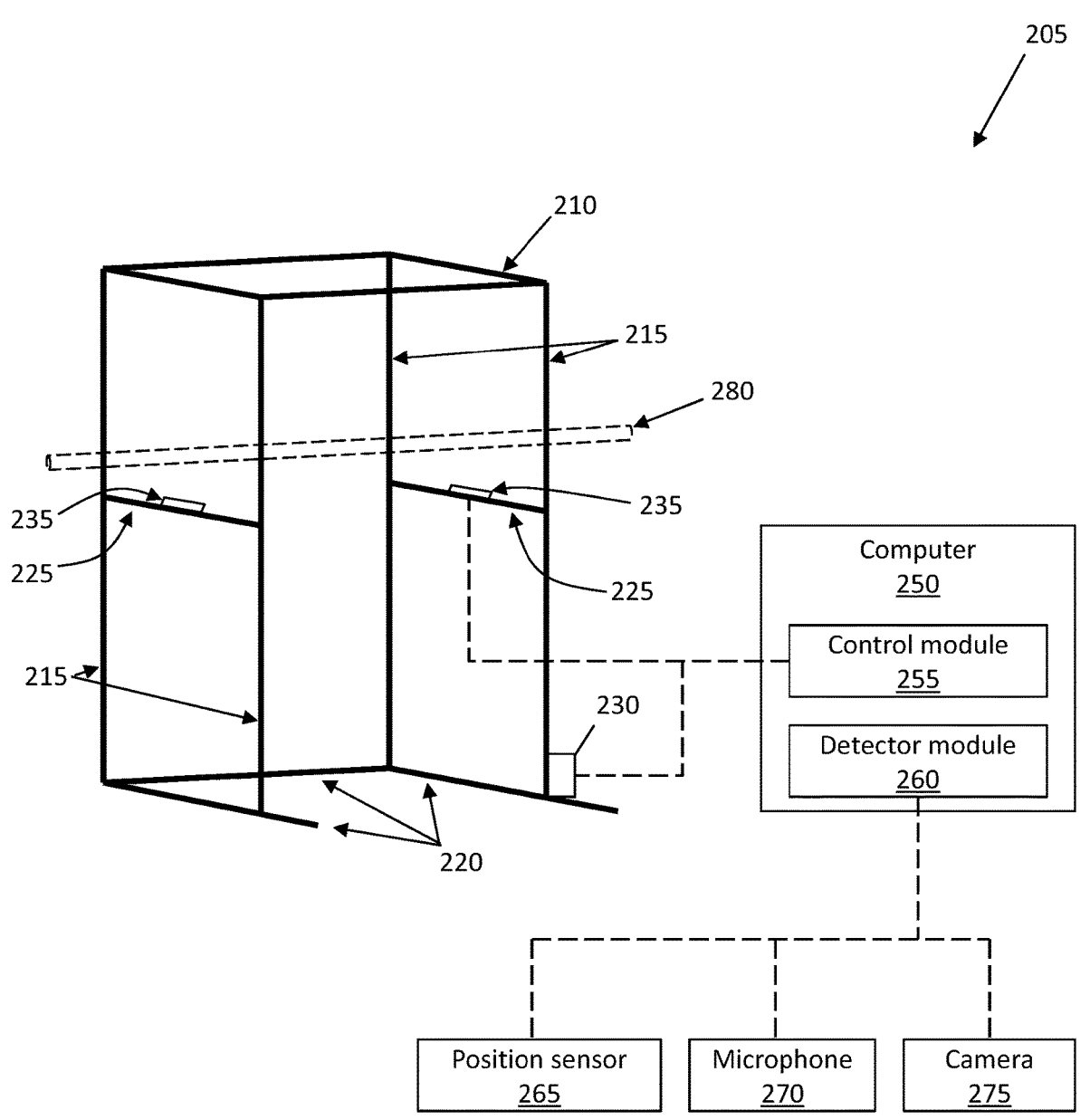
FIG. 2 shows a block diagram of an exemplary environment in accordance with aspects of the present invention.

According to an aspect of the invention there is an intelligent weightlifting apparatus, comprising: a frame comprising vertically oriented members and safety rails that are selectively moveable up and down relative to the vertically oriented members; a position sensor that is configured to detect a position of a barbell; and a computer that is configured to control movement of the safety rails based on data from the position sensor such that a predefined distance is maintained between the safety rails and the barbell during a free weight exercise. The intelligent weightlifting apparatus advantageously provides dynamic adjustment of safety rails during a free weight exercise, which can be helpful when the user is lifting alone.

In embodiments, the computer is configured to move the safety rails to apply an assist force to the barbell in response to detecting a keyword spoken by a user during the free weight exercise. In this manner, the apparatus advantageously provides a user with the ability to obtain lifting assistance using spoken words, which can be helpful when the user is lifting alone. In embodiments, the keyword is one of plural predefined keywords, the assist force is one of plural predefined assist forces, and respective ones of the plural predefined assist forces are associated with respective ones of the plural predefined keywords. In this manner, the apparatus advantageously provides a user with the ability to program different assist levels associated with different keywords, to customize their exercise to their liking. In additional embodiments, the computer is programmed with an algorithm that detects signs of stress, fatigue, or pain from the lifter from data of a microphone in the vicinity of the lifter. In these embodiments, the apparatus provides de-loads the lifter based on detecting such stress, fatigue, or pain. In this manner, the apparatus advantageously provides a user with the ability to obtain assistance even when the user cannot recall one of the keywords.

In embodiments, the computer controls movement of the safety rails using one or more actuators. In this manner, the apparatus advantageously provides automated control and movement of the safety rails during the exercise.

In embodiments, the position sensor comprises a camera and the computer detects the position of the barbell using computer vision with data from the camera. In this manner, the apparatus advantageously provides for precise control of the safety rails to maintain the distance between the safety rails and the barbell.

In embodiments, the computer is configured to perform a pre-exercise safety check based on one or more selected from a group consisting of: total weight of the barbell; and distribution of weight between two ends of the barbell. In this manner, the apparatus advantageously provides for alerting the user to improper total weight or weight distribution before the user begins their exercise, which provides increased safety for the user.

In embodiments, the computer is configured to: perform a repetition safety check during each repetition of the free weight exercise; and move the safety rails to de-load the user based on failing the repetition safety check. In this manner, the apparatus advantageously provides for assisting the user when a problem is detected during the exercise, which provides increased safety for the user. The repetition safety check may be based on one or more selected from a group consisting of: combinatorial logic; and artificial intelligence. In this manner, the apparatus advantageously provides for many different types of checks based on different logic, which provides increased safety for the user. The repetition safety check may be based on one or more selected from a group consisting of: data from the position sensor; data from a microphone; data from a camera; and data from weight sensors. In this manner, the apparatus advantageously provides for many different types of checks based on different types of data, which provides increased safety for the user. The apparatus may employ other types of sensors including but not limited to one or more light detection and ranging (LIDAR) sensors and one or more accelerometers. For example, the computer may be programmed with an algorithm that uses data from one or more accelerometers to detect when the barbell is moving or accelerating at a rate that exceeds a predefined threshold that indicates an unsafe condition, such as the barbell being dropped or otherwise not supported by the user. In these embodiments, the apparatus de-loads the lifter based on detecting such movement or acceleration. The apparatus may also include artificial intelligence programming that learns individual lifting routines on a user-by-user basis based on the data from one or more of the sensors. The artificial intelligence programming may be trained to learn how, at the individual level, each user trains as reflected in the data of the sensors, such that sensory input adjustments may be made according to how each specific user uses the equipment over time.

In embodiments, the computer is configured to: count a number of repetitions of the free weight exercise; and move the safety rails to de-load the user in response to the counted number of repetitions equaling a predefined number of repetitions. In this manner, the apparatus advantageously provides for taking the weight off the user when the user has finished their intended exercise, which allows for safely de-loading the user at the end of an exercise set when they are most tired, which allows the user to focus on their exercise when alone.

In embodiments, the computer stores user data of plural different users and obtains the predefined number of repetitions from the stored user data of one of the plural different users. In this manner, the apparatus advantageously provides for storing and automatically retrieving the exercise profiles of plural different users, which provides convenience for the plural different users. In embodiments, the computer obtains the predefined number of repetitions from manual user input received prior to the free weight exercise. In this manner, the apparatus advantageously provides for a user to provide input to define an exercise, which provides convenience for users who do not have a stored profile.

In accordance with aspects of the invention, there is a method, comprising: detecting, by a processor set, a position of a barbell relative to safety rails of a weightlifting rack; and dynamically controlling, by the processor set, positions of the safety rails using one or more actuators to maintain a predefined distance between the barbell and the safety rails during a free weight exercise. The method advantageously provides dynamic adjustment of safety rails during a free weight exercise, which can be helpful when the user is lifting alone.

In embodiments, the method further comprises controlling the safety rails to move to a position that applies an assist force to the barbell in response to detecting a keyword spoken by a user during the free weight exercise. In this manner, the method advantageously provides a user with the ability to obtain lifting assistance using spoken words, which can be helpful when the user is lifting alone.

In embodiments, the method further comprises: performing a pre-exercise safety check based on one or more selected from a group consisting of: total weight of the barbell; and distribution of weight between two ends of the barbell; and generating an alert to a user in response to failing the pre-exercise safety check. In this manner, the apparatus advantageously provides for alerting the user to improper total weight or weight distribution before the user begins their exercise, which provides increased safety for the user.

In embodiments, the method further comprises: performing a repetition safety check during each repetition of the free weight exercise; and controlling the safety rails to move to a position that de-loads the user based on failing the repetition safety check. For example, the apparatus may be configured to de-load the lifter based on a determination that the lifter is taking too long during a repetition. In this manner, the apparatus advantageously provides for assisting the user when a problem is detected during the exercise, which provides increased safety for the user.

In accordance with aspects of the invention, there is a computer program product comprising one or more computer readable storage media having program instructions collectively stored on the one or more computer readable storage media. The program instructions are executable to: detect a position of a barbell relative to safety rails of a weightlifting rack; and dynamically control positions of the safety rails using one or more actuators to maintain a predefined distance between the barbell and the safety rails during a free weight exercise. The computer program product advantageously provides dynamic adjustment of safety rails during a free weight exercise, which can be helpful when the user is lifting alone.

In embodiments, the program instructions are executable to control the safety rails to move to a position that applies an assist force to the barbell in response to detecting a keyword spoken by a user during the free weight exercise. In this manner, the method advantageously provides a user with the ability to obtain lifting assistance using spoken words, which can be helpful when the user is lifting alone.

In embodiments, the program instructions are executable to: perform a pre-exercise safety check based on one or more selected from a group consisting of: total weight of the barbell; and distribution of weight between two ends of the barbell; and generate an alert to a user in response to failing the pre-exercise safety check. In this manner, the apparatus advantageously provides for alerting the user to improper total weight or weight distribution before the user begins their exercise, which provides increased safety for the user.

In embodiments, the program instructions are executable to: perform a repetition safety check during each repetition of the free weight exercise; and control the safety rails to move to a position that de-loads the user based on failing the repetition safety check. In this manner, the apparatus advantageously provides for assisting the user when a problem is detected during the exercise, which provides increased safety for the user.

Aspects of the present invention relate generally to weightlifting safety equipment and, more particularly, to an intelligent weightlifting rack that provides active monitoring and spotting for a person lifting free weights. Embodiments of the invention include a weightlifting cage with integrated automated spotting capabilities that can serve as safety mechanisms for allowing lifters to finish their lift repetitions/sets by providing a backup or replacement for a human spotter. In implementations, the spotting capabilities can be enacted either automatically via intelligent detection afforded by the system or enacted manually via mechanisms including, but not limited to, designated keyword recognition as spoken by the lifter.

The act of spotting during a free weight exercise routine has generally been achieved by employing another person ("spotter") to be near the person performing the exercise ("lifter"). The spotter watches each exercise repetition ("rep") carefully looking for signs of fatigue or struggle from the lifter. Should the lifter begin to fail to complete the rep ("stall"), generally the spotter aids the lifter by relieving the some of the weight via the use of their own strength. Spotters can also provide a complete unloading of the weight from the lifter ("de-load") by taking the weight from them and racking it.

When no spotter is available (e.g., a lifter is exercising alone at home or an empty gym, etc.), only a few passive techniques exist which allow the lifter to exercise safely. One such passive technique is a free weight rack that includes safety bars that acts as static limit stops. Prior to a set of reps, the lifter situates the safety bars on both sides of the rack at an appropriate height such that should the lifter fail to complete a rep, they can manually de-load the weight from their body by simply dropping the barbell low enough such that the safety bars catch the barbell on either side, thus removing the weight from the lifter. This technique relies on the lifter setting the safety bars to the appropriate height for the current exercise routine. The position of the safety bars is adjustable prior to the lifting; however, the position of the safety bars is static after they have been adjusted and during the lifting. Failure to set the position of the safety bars appropriately (e.g., too high or too low) can lead to the inability to complete the exercise with a full range of motion or failure to properly de-load should the lifter fail the rep. Moreover, free weight racks that include such adjustable safety bars are not universally usable for different types of free weight exercises. For example, power cage style racks with this type of adjustable safety bars are used for squats but cannot be used with bench press or deadlift.

Another passive safety device is the Smith machine, which consists of a barbell that is fixed within guide rails allowing only vertical or near-vertical movement. Behind each vertical post is a series of slots on which the barbell can be hooked. The slots constitute a plurality of predefined, discrete locations where the user can place the barbell when they have finished their exercise or when the weight becomes too great during the exercise. However, the discrete locations make it difficult to use by people of varying heights. Moreover, in this type of machine, the bar movement is restricted by the guide rails, which is undesirable because it forces the user to adopt an unnatural straight-up-and-down 'bar path' which can put shear stress on the knees or back (if squatting) or shoulders (if pressing). Moreover, differently shaped Smith machines can be used for different exercises, but a single Smith machine cannot be used for squats, bench press, and deadlift.

Implementations of the invention address these problems by providing an intelligent weightlifting rack that provides active monitoring and spotting for a person lifting free weights. Embodiments include an intelligent free weight cage with integrated spotting technology centrally run by an on-board computer. Embodiments include dynamic safety rails that are controlled during the lifting to move in a way that maintain a predefined spatial relationship relative to the barbell. Embodiments continuously track the position of the barbell during the lifting and use the real-time position of the barbell to control the dynamically adjustable position of the safety rails. In this manner, implementations of the invention actively control the position of the safety rails during the lifting to maintain a predefined distance between the safety rails and the barbell during the lifting. Implementations may be configured to provide functions including: analysis of barbell movement relative to the lifter; providing various increments of help to a lifter struggling to complete a rep/set; de-loading the lifter when a set of exercises is complete; and detection of rep failure and actuation of de-loading of the barbell from the lifter. For example, the apparatus may be configured to de-load the lifter based on a determination that the lifter is taking too long during a repetition. In this manner, implementations provide a technical solution to the problem of user safety during free weight weightlifting exercises.

In accordance with aspects of the invention there is an apparatus for weightlifting exercise, the apparatus comprising: a vertically oriented cage structure, the cage structure comprising integrated safety rails, wherein the safety rails are adapted to follow a vertical path associated with the movement of a free weight barbell; a sensor element adapted to track the position of the free weight barbell; and a central processor adapted to receive input from the sensor element and to control the movement of the integrated safety rails to maintain a defined relative position between the integrated safety rails and the free weight barbell. The apparatus may include a microphone adapted to provide auditory input to the central processor.

In accordance with aspects of the invention there is a method for providing an integrated spotter, the method comprising: detecting motion of a free weight barbell; determining a de-load required state according to the analysis; and de-loading the barbell. The method may further comprise: receiving audio input from a user; and de-loading the barbell according to the audio input.

It should be understood that, to the extent implementations of the invention collect, store, or employ personal information provided by, or obtained from, individuals (for example, personal profile information) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as spotter code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. The environment 205 includes an intelligent weightlifting rack 210 that includes a computer 250. In embodiments, the intelligent weightlifting rack 210 comprises one or more vertically oriented members 215, one or more horizontally oriented members 220, and one or more safety rails 225. In embodiments, the vertically oriented members 215 and the horizontally oriented members 220 constitute a frame of the intelligent weightlifting rack 210. and the safety rails 225 are moveable in a vertically oriented direction relative to the frame. In the example shown in FIG. 2, the intelligent weightlifting rack 210 comprises a first safety rail 225 moveably connected between two vertical members 215 on a left side of the intelligent weightlifting rack 210 and a second safety rail 225 moveably connected between two vertical members 215 on a right side of the intelligent weightlifting rack 210. In embodiments, the first safety rail 225 and the second safety rail 225 are independently movable relative to one another. The movement of the safety rails 225 may be guided in tracks in the vertically oriented members 215.

In accordance with aspects of the invention, the intelligent weightlifting rack 210 includes one or more actuators 230 that cause movement of the safety rails 225. The actuators 230 may comprise any conventional or later developed actuators that cause translational movement of the safety rails 225 relative to the frame. In one example, the safety rails 225 are guided in the vertically oriented members 215 and the actuators comprise pneumatic or hydraulic actuators with pistons that move relative to cylinders to cause the safety rails 225 to move up and down relative to the frame. In another example, a rack and pinion system is arranged between the safety rails 225 and the vertically oriented members 215, and the actuators 230 rotate the pinion to cause the rack and connected safety rails 225 to move up and down relative to the frame. In another example, the safety rails 225 are held by a windable cables, and the actuators 230 comprise winding motors and spools or pulleys that wind the cables in and out to cause the safety rails 225 to move up and down relative to the frame. The examples are intended to be illustrative and not limiting, and other mechanisms can be used to selectively control the movement of the safety rails 225 relative to the frame of the intelligent weightlifting rack 210. Only one actuator 230 is shown in FIG. 2 for simplicity, but it is understood that plural actuators 230 may be used. In one example, each respective one of the safety rails 230 has its own independently controllable actuator 230.

Still referring to FIG. 2, in embodiments the intelligent weightlifting rack 210 includes one or more weight sensors 235 that collect data that is used to determine how much weight of the barbell 280 is supported by each one of the safety rails 225. In embodiments, each of the safety rails 225 has its own weight sensor 235. The weight sensors 235 may comprise weight transducers (e.g., strain gauge sensors) that are calibrated to detect an amount of weight on the safety rail 225 based on a force exerted on the safety rail 225 by the barbell 280.

With continued reference to FIG. 2, the computer 250 may comprise a computing device such as the computer 101 of FIG. 1. In one example the computer 250 includes a display screen and a keyboard and/or touchpad for receiving user input. In one example the computer 250 includes a display screen that comprises a touch screen display configured to receive user input.

In embodiments, the computer 250 of FIG. 2 comprises a control module 255 and a detector module 260, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The computer 250 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the control module 255 is configured to provide control signals to the actuators 230 for the purpose of controlling (i.e., selectively actuating and de-actuating) the actuators 230 to thereby control the positions of the safety rails 225 relative to the frame. In embodiments, the control module 255 provides the control signals to the actuators 230 based on information that the control module 255 receives from the detector module 260.

In accordance with aspects of the invention, the detector module 260 is configured to determine a position of the safety rails 225 relative to a barbell 280 based on data received from a position sensor 265. In embodiments, based on the determined relative positions determined by the detector module 260, and optionally other factors, the control module 255 provides control signals to the actuators 230 to adjust or maintain the positions of the safety rails 225 according to a configuration.

In embodiments, the position sensor 265 comprises one or more sensors that determine a respective position of each of the safety rails 225 and a position of a barbell 280. In one example, the position sensor 265 comprises one or more cameras that capture images of the safety rails 225 and the barbell 280. In this example, the detector module 260 uses computer vision with the camera images to determine a position of each of the safety rails 225 relative to the barbell 280. The computer vision may be implemented using various computer vision algorithms such as a fast region-based convolutional neural network (F-RCNN), a you only look once (YOLO) algorithm, etc. In another example, the position sensor 265 comprises plural electromagnetic-based sensors, such as Hall effect sensors or inductive sensors, that are positioned at predefined locations along the vertically oriented members 215 and that are configured to detect each of the safety rails 225 and the barbell 280 at respective ones of the predefined locations. In this example, this sensor data is passed to the detector module 260, which is calibrated to determine relative positions of each of the safety rails 225 relative to the barbell 280 based on the sensor data. The examples are intended to be illustrative and not limiting, and the position sensor 265 can comprise any type, or combinations of types, of sensors that detect data that can be used by the detector module 260 to determine relative positions of each of the safety rails 225 relative to the barbell 280.

In accordance with aspects of the invention, the detector module 260 is configured to receive data from one or more microphones 270 in the vicinity of the intelligent weightlifting rack 210. In embodiments, the microphone 270 collects audible data including words and utterances spoken by a user utilizing the intelligent weightlifting rack 210. In embodiments, the detector module 260 analyzes the data of the microphone 270 in real time to identify keywords. In embodiments, based on the detector module 260 detecting a particular keyword, the control module 255 provides control signals to the actuators 230 to adjust or maintain the positions of the safety rails 225 according to a rule associated with the keyword.

In accordance with aspects of the invention, the detector module 260 is configured to receive data from one or more cameras 275 in the vicinity of the intelligent weightlifting rack 210. In embodiments, the camera 275 is positioned and focused to gather video images of the user utilizing the intelligent weightlifting rack 210 for lifting free weights. In embodiments, the detector module 260 is configured to use an artificial intelligence component with data from the microphone 270 and/or the camera 275 to determine a context associated with the user utilizing the intelligent weightlifting rack 210 for lifting free weights. In embodiments, based on the context determined by the detector module 260, the control module 255 provides control signals to the actuators 230 to adjust or maintain the positions of the safety rails 225 according to a predefined configuration. In one example, the detector module 260 is configured to use an artificial intelligence component to detect that the user is fatigued based on data from one or both of the camera 275 and the position sensor 265. For example, the artificial intelligence component may use facial recognition techniques with data from the camera 275 to determine that the user is experiencing fatigue. In another example, the artificial intelligence component may use data from the position sensor 265 to determine that the user is not lifting the barbell at a rate that is consistent with this user's historical data (e.g., cadence of reps), which may be used to detect that the user is fatigued. In both examples, the computer may be programed to de-load the user based on detecting user fatigue.

Figures 3A, 3B, 3C, 3D, 3E, 3F:
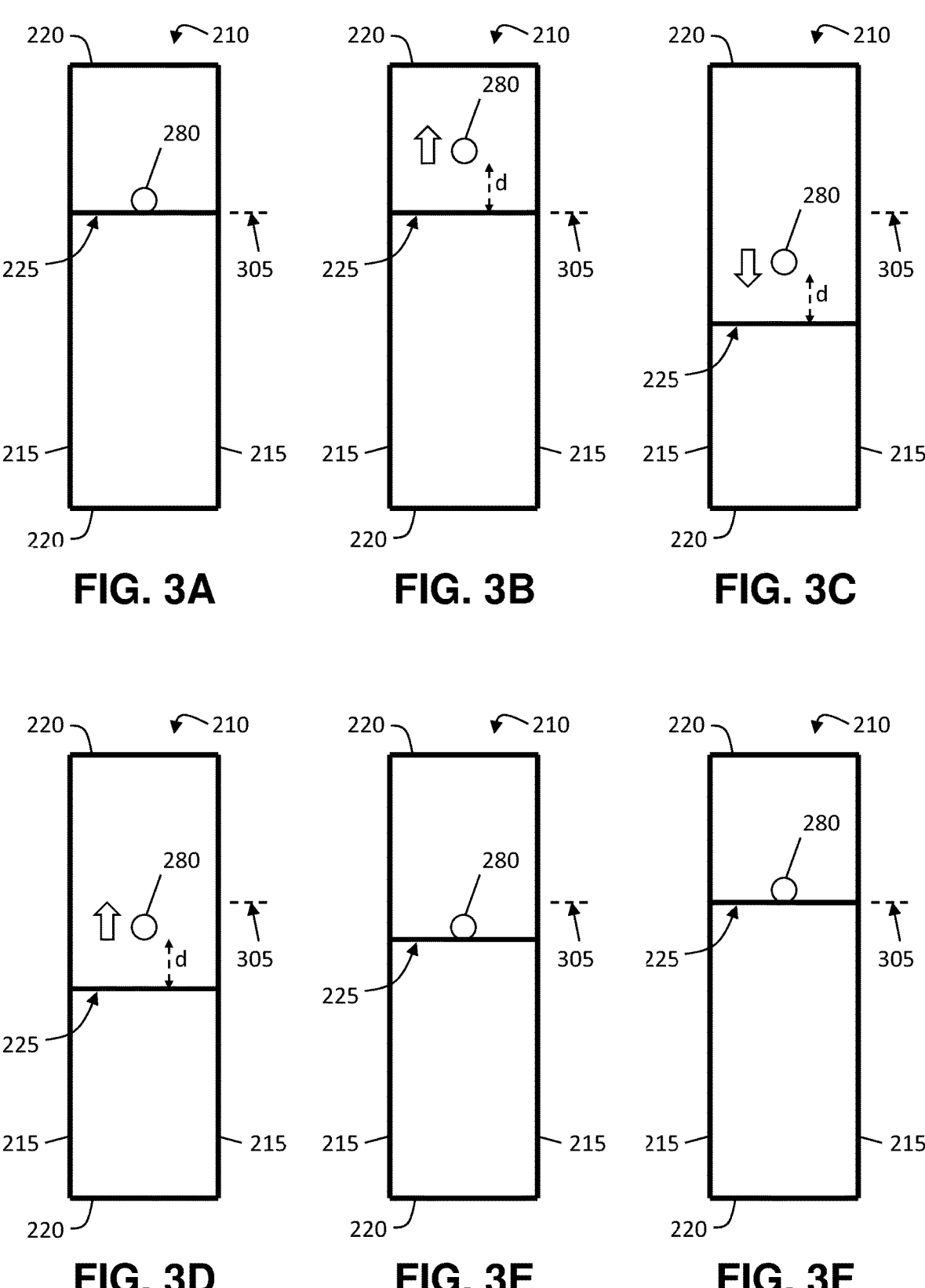
FIGS. 3A-F illustrate exemplary operation of an intelligent weightlifting rack in accordance with aspects of the invention.

FIGS. 3A-F illustrate exemplary operation of the intelligent weightlifting rack 210 in accordance with aspects of the invention. FIGS. 3A-F show a side view of thew rack 210 including vertically oriented members 215, horizontally oriented members 220, and spotting rails 225. In FIG. 3A, the safety rails 225 support the full weight of the barbell 280 at a starting position indicated at dashed line 305. In FIG. 3B, the user has lifted the barbell 280 upward from the starting position 305 as part of their exercise. As shown in FIG. 3B, the barbell 280 is a distance "d" above the safety rails 225. In embodiments, the distance "d" is programmable in that the user may provide input via an interface of the computer that defines the distance "d". In other embodiments, the computer automatically determines the distance "d" for a particular user based on one or more of: experience level of the user; weight of the barbell 280; number of reps in a set; and age of the lifter. The computer may determine the distance "d" using lookup tables based on one or more of the parameters.

In FIG. 3C, the user has lowered the barbell 280 as part of their exercise. As shown in FIG. 3C, the intelligent weightlifting rack 210 moves the safety rails 225 downward with the movement of the barbell 280 to maintain the distance "d" between the safety rails 225 and the barbell 280. As described with respect to FIG. 2, the detector module 260 may detect the positions of the safety rails 225 relative to the barbell 280 using the position sensor 265, and may cause the control module 255 to control the actuators 230 to move the safety rails 225 to maintain the distance "d" based on these detected positions.

In FIG. 3D, the user has begun raising the barbell 280 (from the position shown in FIG. 3C) as part of their exercise. As shown in FIG. 3D, the intelligent weightlifting rack 210 moves the safety rails 225 upward with the movement of the barbell 280 to maintain the distance "d" between the safety rails 225 and the barbell 280.

FIG. 3E shows an example of the intelligent weightlifting rack 210 moving the safety rails 225 upward to support some, but not all, of the weight of the barbell 280. In embodiments, and as described herein, the intelligent weightlifting rack 210 may be configured to help the user complete the exercise based on the user saying one or more predefined keywords. In one example, the intelligent weightlifting rack 210 is configured to move the safety rails 225 into contact with the barbell 280 and support a first amount of weight (e.g., five pounds) of the barbell 280 in response to the user saying a first keyword (e.g., "spot"), and rack 210 is configured to move the safety rails 225 into contact with the barbell 280 and support a second amount of weight (e.g., ten pounds) of the barbell 280 in response to the user saying a second keyword (e.g., "help"). In embodiments, in response to detecting one of these keywords via the microphone 270, the detector module 260 causes the control module 255 to control the actuators 230 to move the safety rails 225 upward to support an amount of weight of the barbell 280 associated with the detected keyword. In embodiments, the detector module 260 may be programmed with the keywords and their associated weights, e.g., by user input to the computer 250 prior to the exercise. The control module 255 may use data from the weight sensors 235 to determine when the spotter rails 225 are supporting the predefined amount of weight associated with one of the keywords. In this manner, the intelligent weightlifting rack 210 is configured to move the safety rails 225 to apply an assist force to the barbell 280 in response to detecting a keyword spoken by a user during the free weight exercise.

FIG. 3F shows an example of the intelligent weightlifting rack 210 moving the safety rails 225 upward to support all the weight of the barbell 280. In embodiments, and as described herein, the intelligent weightlifting rack 210 may be configured to de-load the user completely based on the user saying a predefined keyword. In one example the keyword is "de-load" although other words may be programmed by the user via input to the computer 250 prior to the exercise. In embodiments, in response to detecting this keyword via the microphone 270, the detector module 260 causes the control module 255 to control the actuators 230 to move the safety rails 225 upward to support the entire weight of the barbell 280. In one example, in response to detecting this keyword via the microphone 270, the detector module 260 causes the control module 255 to control the actuators 230 to move the safety rails 225 upward to the starting position 305.

Figure 4:
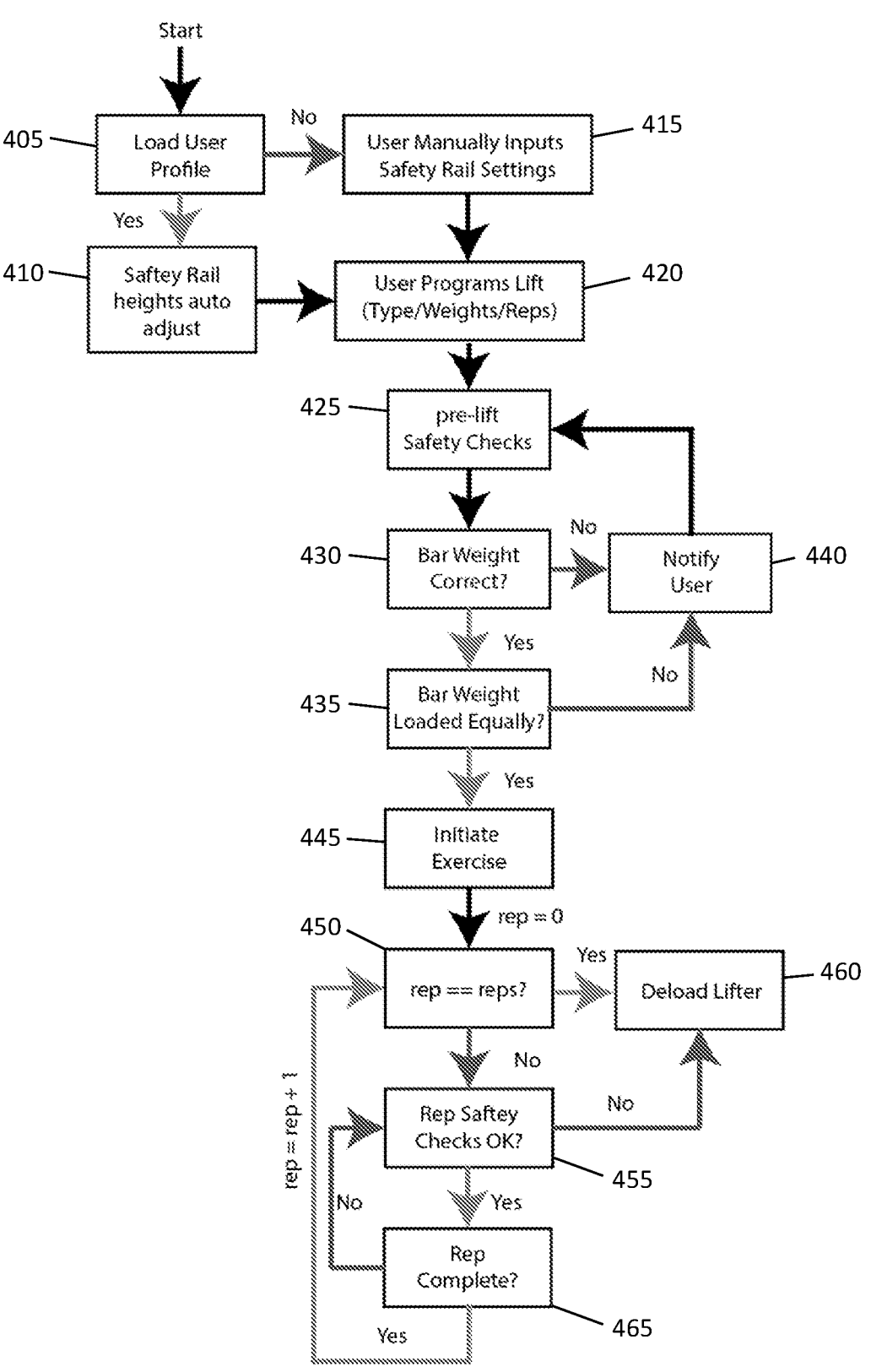
FIGS. 4 and 5 show flowcharts of exemplary methods in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

The method of FIG. 4 is an exemplary operation of the intelligent weightlifting rack 210. In embodiments, at step 405 the intelligent weightlifting rack 210 begins by allowing the lifter (e.g., person using the intelligent weightlifting rack 210 for a free weight exercise) to load a previously stored personal profile. This may be done via an interface of the computer 250, e.g., by logging in using credentials such as a username and password, etc. This personal profile may contain information such as the lifter's preferences for the safety rail heights on a lift-by-lift basis, the lifter's previous exercise routines, current exercise routines, etc. The computer 250 can be programmed to store numerous user lifting profiles each with individualized settings (e.g., barbell heights, lifts, weights, routines, etc.). At step 410, after automatically loading the lifter information at step 405, the intelligent weightlifting rack 210 automatically adjusts the safety rails 225 heights based on information in the lifter profile. In embodiments, if no profile is saved, then at steps 415 and 420 the intelligent weightlifting rack 210 allows the lifter to personally program such information for the current lifting session, e.g., via an interface of the computer 250.

At step 425, the intelligent weightlifting rack 210 performs a series of pre-lift safety checks. These checks may include but are not limited to: determining that the appropriate weights have been loaded on the barbell 280 for the pre-programmed exercise (step 430); and determining that the weight has been loaded equally on either side of the barbell 280 by measuring the weight on the safety rails 225 (step 435). In embodiments, the control module 255 uses data from the weight sensors 235 to determine: (i) whether the weight of the barbell 280 matches the weight for this lifting session; and (ii) whether the weight on the barbell 280 is equally loaded on the two sides of the barbell 280 (e.g., a distribution of weight between two ends of the barbell). In embodiments, if any of these pre-lift safety checks fail, then at step 440 the intelligent weightlifting rack 210 notifies the lifter of the failure and awaits a corrective action before performing the safety checks again. In this manner, the intelligent weightlifting rack 210 is configured to perform a pre-exercise safety check based on one or more selected from a group consisting of: total weight of the barbell; and distribution of weight between two ends of the barbell.

In embodiments, if all the safety checks pass, then at step 445 the intelligent weightlifting rack 210 initiates the exercise by moving the safety rails 225 to move the barbell 280 to the preprogrammed height (e.g., the starting point 305 in FIG. 3A) and initiates an internal exercise repetition counter ("rep") to zero. Once the bar is detected to be removed from the safety rails 225 (e.g., as shown at FIG. 3B), the intelligent weightlifting rack 210 controls the safety rails 225 to continuously maintain the distance "d" from the barbell 280 and begins to perform a series of rep safety checks (step 455) as described herein. In embodiments, if the intelligent weightlifting rack 210 determines the lifter has failed the rep based on the safety checks, then at step 460 the intelligent weightlifting rack 210 automatically de-loads the weight from the lifter to prevent injury (e.g., as shown at FIG. 3F). In this manner, the intelligent weightlifting rack 210 is configured to: perform a repetition safety check during each repetition of the free weight exercise; and control the safety rails 225 to move to a position that de-loads the user 280 based on failing the repetition safety check.

If the repetition safety checks pass, then at step 465 the intelligent weightlifting rack 210 determines whether the rep is complete via monitoring if the safety rails 225 have returned to their initial position (e.g., starting point 305). If they have, then the repetition counter is then incremented by 1 and the process is repeated. Once the repetition counter is determined to have equal value with the variable "reps" (450) the intelligent weightlifting rack 210 then automatically de-loads the lifter (e.g., by returning the safety rails to the starting position 305, e.g., as at FIG. 3F) allowing the lifter to safely finish the exercise.

Still referring to the method of FIG. 4, in embodiments the intelligent weightlifting rack 210 is configured to assist the user at any time after step 445 based on detecting that the user speaks a pre-defined keyword. The keyword may be one word or plural words (e.g., a phrase) but is referred to herein as a keyword. As described with respect to FIGS. 3E and 3F, the detector module 260 may be configured to monitor data collected by the microphone 270 for keywords spoken by the user during the lifting exercise. Each predefined keyword may be associated with a predefined amount of assistance to be provided by the intelligent weightlifting rack 210. Non-limiting examples of keywords include: "spot", "help", and "de-load." Non-limiting amounts of assistance include: five pounds, ten pounds, and full de-load. The keywords and their associated amounts of assistance may be defined by the user providing input to the computer 250 via a user interface of the computer 250. In this manner, the intelligent weightlifting rack 210 is configured to move the safety rails 225 to apply an assist force to the barbell 280 in response to detecting a keyword spoken by a user during the free weight exercise.

With continued reference to the method of FIG. 4, the safety checks at step 455 may be based on data from one or more of the weight sensors 235, position sensor 265, microphone 270, and camera 275. The safety checks may be based on combinatorial logic and/or an artificial intelligence (AI) component of the detector module 260. An example of a combinatorial logic safety check is as follows: if the full weight of the barbell 280 is currently supported by the user (e.g., determined from the weight sensors) and the user not moved for more than a predefined amount of time (e.g., determined from the position sensor 265), then de-load the lifter. The predefined amount of time may be defined by the user via input to the computer 250. In this manner, the apparatus may be configured to de-load the lifter based on a determination that the lifter is taking too long during a repetition, e.g., as determined based on the predefined amount of time. Alternatively, an AI component of the detector module 260 may determine the predefined amount of time based on analyzing data obtained from this user's past exercises, e.g., based on determining an average time that the user takes to lift this amount of weight at this rep number in this set number.

Other non-limiting examples of safety checks include: if the barbell wobbling more than a predefined amount (e.g., determined based on data from the position sensor 265), then de-load the user; if the user is taking too long to complete a rep (e.g., compared to a predefined amount of time) then de-load the user; if the user is distracted (e.g., determined using AI analysis of data from the microphone 270 and/or camera 275), then de-load the user; if there is too much weight on the barbell 280 (e.g., based on a difference between the current session and the last time the user performed this exercise), then de-load the user. In one example, the AI component of the detector module 260 may determine that a lifter is distracted based on data from the microphone 270, e.g., by detecting the voice of another person talking to the lifter, by detecting a phone ringing, etc.

In another example, the AI component of the detector module 260 may determine that a lifter is distracted based on data from the camera 275, e.g., by detecting another person walking into the room with the lifter, by detecting a facial expression and/or gesture of the lifter that indicates distraction, etc. Other safety checks based on the data from one or more of the weight sensors 235, position sensor 265, microphone 270, and camera 275 may be used.

Figure 5:
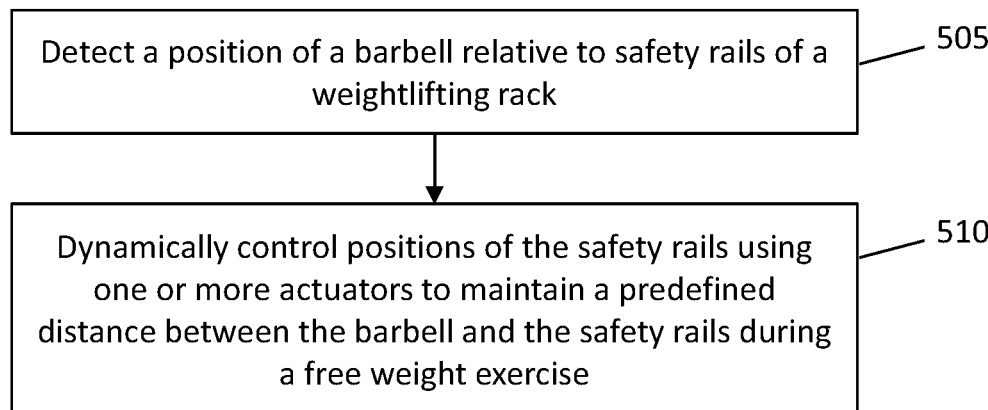

FIG. 5 shows a flowchart of an exemplary method in accordance with aspects of the present invention. Steps of the method may be carried out in the environment of FIG. 2 and are described with reference to elements depicted in FIG. 2.

At step 505, the apparatus detects the position of a barbell relative to safety rails of a weightlifting rack. In embodiments, the detector module 260 detects the position of the barbell 280 using data from the position sensor 265. The position sensor 265 may comprise a camera 275 and the detector module 260 may detect the position of the barbell 280 using computer vision techniques with the data from the camera 275.

At step 510, the apparatus dynamically controls positions of the safety rails using one or more actuators to maintain a predefined distance between the barbell and the safety rails during a free weight exercise. In embodiments, based on the detected position of the barbell 280 and the safety rails 225, the control module 255 sends controls signals to the actuators 230 to selectively move the safety rails 225 such as to maintain a predefined distance "d" between each of the safety rails 225 and the barbell 280.

The method of FIG. 5 may further comprise controlling the safety rails 225 to move to a position that applies an assist force to the barbell 280 in response to detecting a keyword spoken by a user during the free weight exercise. In embodiments, applying an assist force to the barbell 280 comprises moving the safety rails 225 to a position such that the safety rails 225 support some but not all of the weight of the barbell 280.

The method of FIG. 5 may further comprise performing a pre-exercise safety check based on one or more selected from a group consisting of: total weight of the barbell; and distribution of weight between two ends of the barbell. The method may further comprise generating an alert to a user in response to failing the pre-exercise safety check.

The method of FIG. 5 may further comprise: performing a repetition safety check during each repetition of the free weight exercise; and controlling the safety rails to move to a position that de-loads the user based on failing the repetition safety check. In embodiments, de-loading the lifter (or user) comprises moving the safety rails 225 to a position such that the safety rails 225 support all of the weight of the barbell 280.

As will be understood by the present disclosure, implementations of the invention provide an intelligent weightlifting apparatus, comprising: a frame comprising vertically oriented members 215 and safety rails 225 that are selectively moveable up and down relative to the vertically oriented members; a position sensor 265 that is configured to detect a position of a barbell 280; and a computer 250 that is configured to control movement of the safety rails 225 based on data from the position sensor 265 such that a predefined distance is maintained between the safety rails 225 and the barbell 280 during a free weight exercise. In embodiments, the computer 250 is configured to move the safety rails 225 to apply an assist force to the barbell 280 in response to detecting a keyword spoken by a user during the free weight exercise. In embodiments, the keyword is one of plural predefined keywords, the assist force is one of plural predefined assist forces, and respective ones of the plural predefined assist forces are associated with respective ones of the plural predefined keywords. In embodiments, the computer 250 controls movement of the safety rails 225 using one or more actuators 230. In embodiments, the position sensor 265 comprises a camera, and the computer 250 detects the position of the barbell 280 using computer vision with data from the camera. In embodiments, the computer 250 is configured to perform a pre-exercise safety check based on one or more selected from a group consisting of: total weight of the barbell 280; and distribution of weight between two ends of the barbell 280. In embodiments, the computer 250 is configured to: perform a repetition safety check during each repetition of the free weight exercise; and move the safety rails to de-load the user based on failing the repetition safety check. In embodiments, the repetition safety check is based on one or more selected from a group consisting of: combinatorial logic; and artificial intelligence. In embodiments, the repetition safety check is based on one or more selected from a group consisting of: data from the position sensor 265; data from a microphone 270; data from a camera 275; and data from weight sensors 235. In embodiments, the computer 250 is configured to count a number of repetitions of the free weight exercise and move the safety rails 225 to de-load the user 280 in response to the counted number of repetitions equaling a predefined number of repetitions. In embodiments, the computer 250 stores user data of plural different users and obtains the predefined number of repetitions from the stored user data of one of the plural different users. In embodiments, the computer 250 obtains the predefined number of repetitions from manual user input received prior to the free weight exercise.

As will be understood by the present disclosure, implementations of the invention provide an apparatus comprising a weightlifting rack equipped with intelligent weight-lifting spotting and de-loading capabilities integrated with an on-board computer. In embodiments, automated spotting and de-loading safety bars (e.g., safety rails 225) are integrated into the power rack via vertically moving tracks. In embodiments, the automated spotting and de-loading bars track the barbell 280 during an exercise, keeping a constant distance between themselves and the barbell 280. In embodiments, lifter assistance is provided via numerous detection methods including, but not limited to: voice/keyword detection (e.g., "spot", "help", and "de-load"); and detection of no barbell movement for a preset amount of time. In embodiments, the detection of barbell movement is provided via video image recognition, accelerometer data, etc. In embodiments, the computer uses artificial intelligence computer vision algorithms to detect and track the barbell movement continuously in real time. In embodiments, the barbell movement data is analyzed by the on-board computer. In embodiments, the artificial intelligence is used to actuate de-loading of the barbell. In embodiments, the computer is programmed with exercise routines (e.g., lifts>sets>reps) and adjusts the smart spot system to accommodate the starting/ending positions of the exercises/routines. In embodiments, the computer stores a database of users and their preferences/barbell settings allowing for the setting of the correct barbell positions for each user/lift combination. In embodiments, the computer detects uneven barbell loads via the integrated spotter and alerts the exerciser thus preventing injury from uneven weighted lifts. In embodiments, when a set of reps is complete, the integrated spotting technology de-loads the weight from the lifter.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method. via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An intelligent weightlifting apparatus, comprising:
a frame comprising vertically oriented members and safety rails that are selectively moveable up and down relative to the vertically oriented members;
a position sensor that is configured to detect a position of a barbell; and
a computer that is configured to control movement of the safety rails based on data from the position sensor such that a predefined distance is maintained between the safety rails and the barbell during a free weight exercise,
wherein the computer is configured to move the safety rails to apply an assist force to the barbell in response to detecting a keyword spoken by a user during the free weight exercise;
the keyword is one of plural predefined keywords input to the computer by the user prior to the free weight exercise;
the assist force is one of plural predefined assist forces input to the computer by the user prior to the free weight exercise; and
respective ones of the plural predefined assist forces are associated with respective ones of the plural predefined keywords.

2. The intelligent weightlifting apparatus of claim 1, wherein the computer is configured to:
perform a repetition safety check during each repetition of the free weight exercise; and move the safety rails to de-load a user based on failing the repetition safety check.

3. The intelligent weightlifting apparatus of claim 2, wherein the repetition safety check is based on artificial intelligence.

4. The intelligent weightlifting apparatus of claim 2, wherein the repetition safety check is based on one or more selected from a group consisting of: data from the position sensor; data from a microphone; data from a camera; and data from weight sensors.

5. The intelligent weightlifting apparatus of claim 1, wherein the computer is configured to:
count a number of repetitions of the free weight exercise; and
move the safety rails to de-load a user in response to the counted number of repetitions equaling a predefined number of repetitions.

6. The intelligent weightlifting apparatus of claim 5, wherein:
the computer stores user data of plural different users; and
the computer obtains the predefined number of repetitions from the stored user data of one of the plural different users.

7. The intelligent weightlifting apparatus of claim 5, wherein the computer obtains the predefined number of repetitions from manual user input received prior to the free weight exercise.

8. The intelligent weightlifting apparatus of claim 1, wherein the computer controls movement of the safety rails using one or more actuators.

9. The intelligent weightlifting apparatus of claim 1, wherein:
the position sensor comprises a camera; and
the computer detects the position of the barbell using computer vision with data from the camera.

10. The intelligent weightlifting apparatus of claim 1, wherein the computer is configured to perform a pre-exercise safety check based on
distribution of weight between two ends of the barbell.

11. The intelligent weightlifting apparatus of claim 1, wherein the assist force applied to the barbell is less than a total weight of the barbell and is configured to help the user complete the free weight exercise.

12. The intelligent weightlifting apparatus of claim 1, wherein:
a first one of the plural predefined assist forces is less than a total weight of the barbell; and
a second one of the plural predefined assist forces is less than a total weight of the barbell and greater than the first one of the plural predefined assist forces.

13. A computer-implemented method, comprising:
receiving, by a processor set, user input defining plural keywords and plural assist forces, wherein respective ones of the plural assist forces are associated with respective ones of the plural keywords, and wherein the user input is received from a user via a user interface of a computer associated with a weightlifting rack;
detecting, by the processor set, a position of a barbell relative to safety rails of the weightlifting rack;
dynamically controlling, by the processor set, positions of the safety rails using one or more actuators to maintain a predefined distance between the barbell and the safety rails during a free weight exercise of the user utilizing the weightlifting rack;
performing a repetition safety check during respective repetitions of the free weight exercise, the repetition safety check being based on artificial intelligence; and controlling the safety rails to move to a position that de-loads the user based on failing the repetition safety check, wherein the computer is configured to move the safety rails to apply a respective one of the plural assist forces to the barbell in response to detecting a respective one of the plural keywords spoken by the user during the free weight exercise.

14. The computer-implemented method of claim 13, further comprising:

performing a pre-exercise safety check based on one or more selected from a group consisting of: total weight of the barbell; and distribution of weight between two ends of the barbell; and generating an alert to a user in response to failing the pre-exercise safety check.

15. The computer-implemented method of claim 13, wherein the repetition safety check comprises one or more selected from a group consisting of:

determining whether the user is distracted using the artificial intelligence with camera data or microphone data; and determining whether the user is fatigued using the artificial intelligence with the camera data.

16. A computer program product comprising one or more computer readable storage media having program instructions collectively stored on the one or more computer readable storage media, the program instructions executable to:

receive user input defining plural predefined keywords and plural predefined assist forces, wherein respective ones of the plural predefined assist forces are associated with respective ones of the plural predefined keywords, and wherein the user input is received from a user via a user interface of a computer associated with a weight-lifting rack;

detect a position of a barbell relative to safety rails of the weightlifting rack;

dynamically control positions of the safety rails using one or more actuators to maintain a predefined distance between the barbell and the safety rails during a free weight exercise; and apply a respective one of the plural predefined assist forces to the barbell in response to detecting a respective one of the plural predefined keywords spoken by a user during the free weight exercise, wherein the plural predefined assist forces are configured to help the user complete the free weight exercise.

17. The computer program product of claim 16, wherein the program instructions are executable to:

perform a pre-exercise safety check based on one or more selected from a group consisting of: total weight of the barbell; and distribution of weight between two ends of the barbell; and generate an alert to a user in response to failing the pre-exercise safety check.

18. The computer program product of claim 16, wherein the program instructions are executable to:

perform a repetition safety check during each repetition of the free weight exercise; and control the safety rails to move to a position that de-loads a user based on failing the repetition safety check.

19. The computer program product of claim 16, wherein:

a first one of the plural predefined assist forces is less than a total weight of the barbell; and a second one of the plural predefined assist forces is less than a total weight of the barbell and greater than the first one of the plural predefined assist forces.

* * * * *